(No Model.)
L. HERING.
DEVICE FOR REEFING SAILS.
No. 315,501. Patented Apr. 14, 1885.
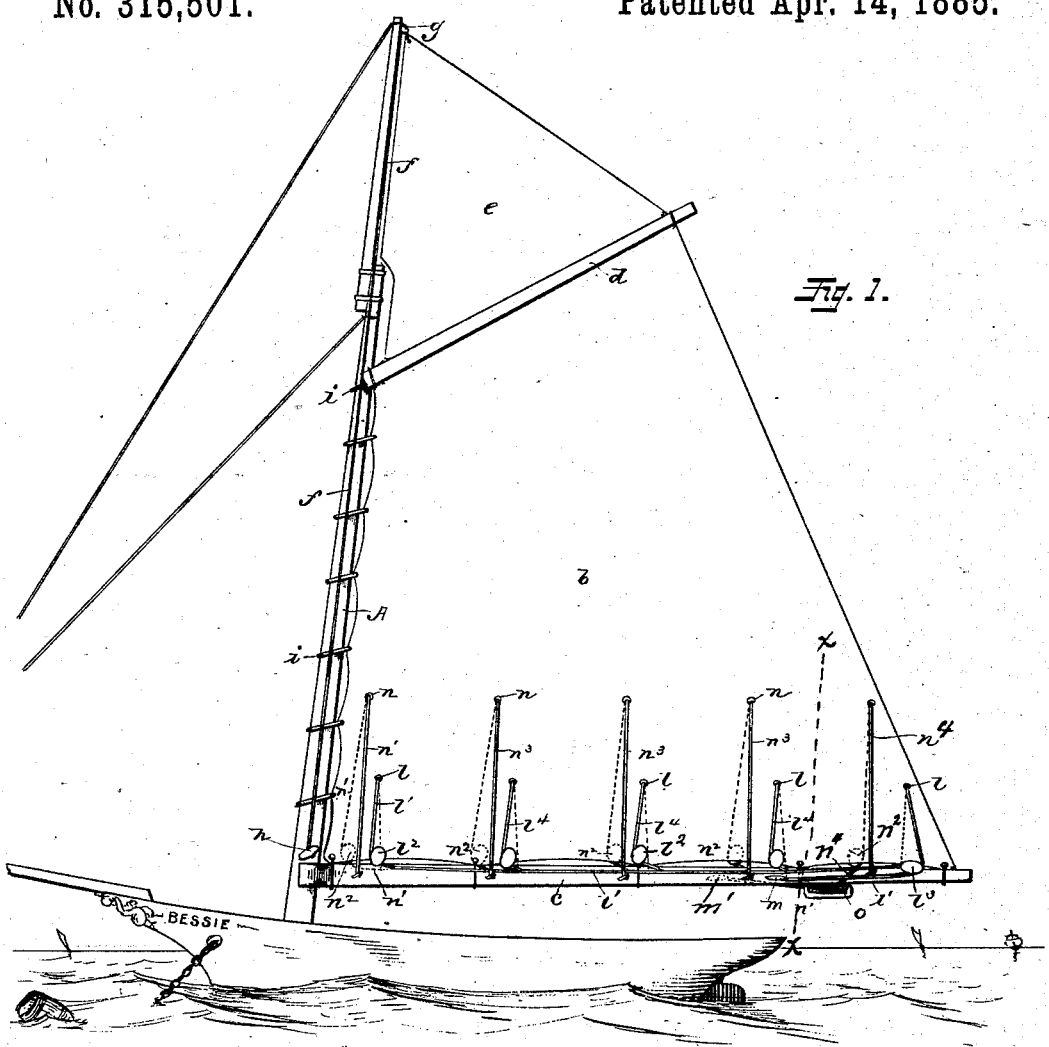
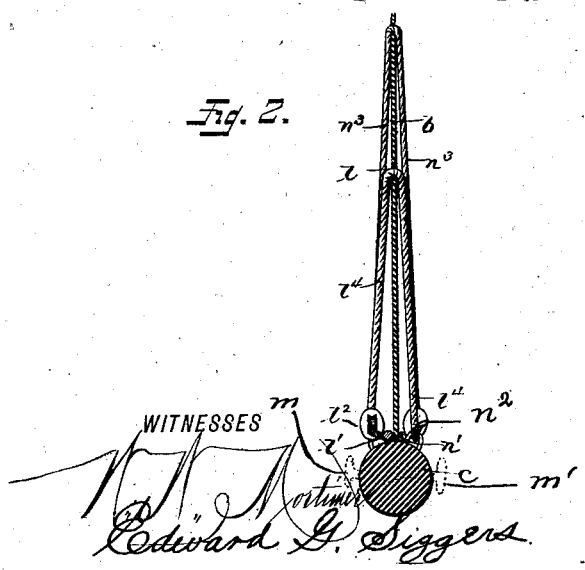
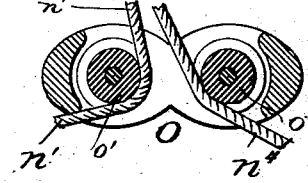

UNITED STATES PATENT OFFICE.

LEN HERING, OF ISLE ST. GEORGE, OHIO.

DEVICE FOR REEFING SAILS.

SPECIFICATION forming part of Letters Patent No. 315,501, dated April 14, 1885.

Application filed February 18, 1885. (No model.)

*To all whom it may concern:*

Be it known that I, LEN HERING, a citizen of the United States, residing at Isle St. George, in the county of Ottawa and State of Ohio, have invented a new and useful Improvement in Devices for Reefing Sails, of which the following is a specification, reference being had to the accompanying drawings.

My invention relates to an improvement in devices for reefing sails; and it consists in certain improvements therein, which will be hereinafter fully described with reference to the accompanying drawings, in which—

Figure 1 is a side elevation of a sail provided with my improved reefing devices. Fig. 2 is a partial vertical sectional view taken on the line $x\ x$ of Fig. 1. Fig. 3 is a detailed view.

A represents the mast, $b$ the mainsail, $c$ the boom, $d$ the gaff, and $e$ the top-sail. The top-sail and mainsail are formed together, as here shown, and a halyard, $f$, is secured to the top-sail, passes over a block, $g$, that is secured to the mast-head, passes down the mast, and is secured to a cleat, $h$, that is made fast to the lower end of the mast. The luff of the sails is secured to the mast by the rings $i$.

$l$ represents a row of reef-eyelets that are worked in the mainsail at a suitable height above the boom, and $n$ represents a row of similar eyelets that are worked in the mainsail at a suitable distance above the lower row. Any desired number of rows may be formed in the sail, though only two are here shown.

$l'$ represents a reef-line, which is secured to the boom near the mast, passes through the eyelet of the row $l$ that is nearest the luff, and from thence through a block, $l^2$, secured on the inner end of the boom, and from thence the line passes along the boom to a block, $l^3$, that is secured near the outer end thereof, and from the said block the free end of the line passes back to a cleat, $m$, that is secured at a suitable distance from the outer end of the boom.

Reef-points $l^4$ are secured at one end to the boom, pass through the eyelets $l$ and down through blocks $l^2$, and are secured to the reef-line $l'$.

$n'$ represents a reef-line which is secured to the boom near the mast, passes through the eyelet of the row $n$ that is nearest to the luff of the sail, and from thence through a block, $n^2$, secured on the inner end of the boom, and from thence the line passes along the boom to a block, $o$, which is secured to the under side of the boom at a suitable distance from its outer end. The block $o$ is provided with two sheaves, $o'$ and $o^2$, which are journaled in the ends of the block and leave a space between them, as shown at Fig. 3. The reef-line $n'$ passes over the sheave $o'$ and is made fast to the cleat $m'$. Reef-points $n^3$ are secured at one end to the boom, pass through the eyelets $n$ and down through blocks $n^2$, and are secured to the reef-line $n'$. To the outer end of the boom is secured a leech reef-line, $n^4$, which passes through the leech-eyelet of the row $n$, down through a block, $n^2$, secured to the boom, and from thence passes over the sheave $o^2$ of the block $o$ and is joined to the reef-line $n'$.

By providing the block $o$ near the outer end of the boom the sail can be reefed by a man stationed at the tiller, which is an advantage of great importance when the boat is being sailed by a single person, or in the event of a sudden squall.

I am aware that the arrangement of the eyelets, the reef-lines, and the reef-points, as hereinbefore described, is not broadly new, and this, broadly, I disclaim.

Having thus described my invention, I claim—

The sail having the rows of eyelets $n\ l$, in combination with the mast, the gaff, the boom, blocks $l^2\ n^2$, arranged along the boom, block $l^3$, secured near the outer end thereof, and block $o$, having sheaves $o'\ o^2$ secured to the boom, reef-line $l'$, secured to the inner end of the boom, passing through the luff-eyelet of the row $l$, through block $l^2$ at inner end of boom, and block $l^3$ at outer end thereof, reef-points $l^4$, secured to the boom, passing through eyelets $l$, blocks $l^2$, and secured to the reef-line $l'$, reef-line $n'$, secured to inner end of boom, passing through luff-eyelet of row $n$, through block $n^2$ at inner end of boom, and through block $o$, reef-points $n^3$, secured to the boom, passing through eyelets $n$, blocks $n^2$, and secured to the reef-line $n'$, leech reef-line $n^4$, secured to outer end of boom, passing through leech-eyelet $n$, a block, $n^2$, and block $o$, and secured to the reef-line $n'$, and cleats secured to the boom for the free ends of the reef-lines, substantially as shown and described.

In testimony that I claim the foregoing as my own I have hereto affixed my signature in presence of two witnesses.

LEN HERING.

Witnesses:
W. R. SMITH,
G. J. HERING.